Feb. 22, 1966          A. SLUTSKY          3,237,198
MULTIPLE POSITION ORDERING APPARATUS
Filed Dec. 28, 1961          10 Sheets-Sheet 1
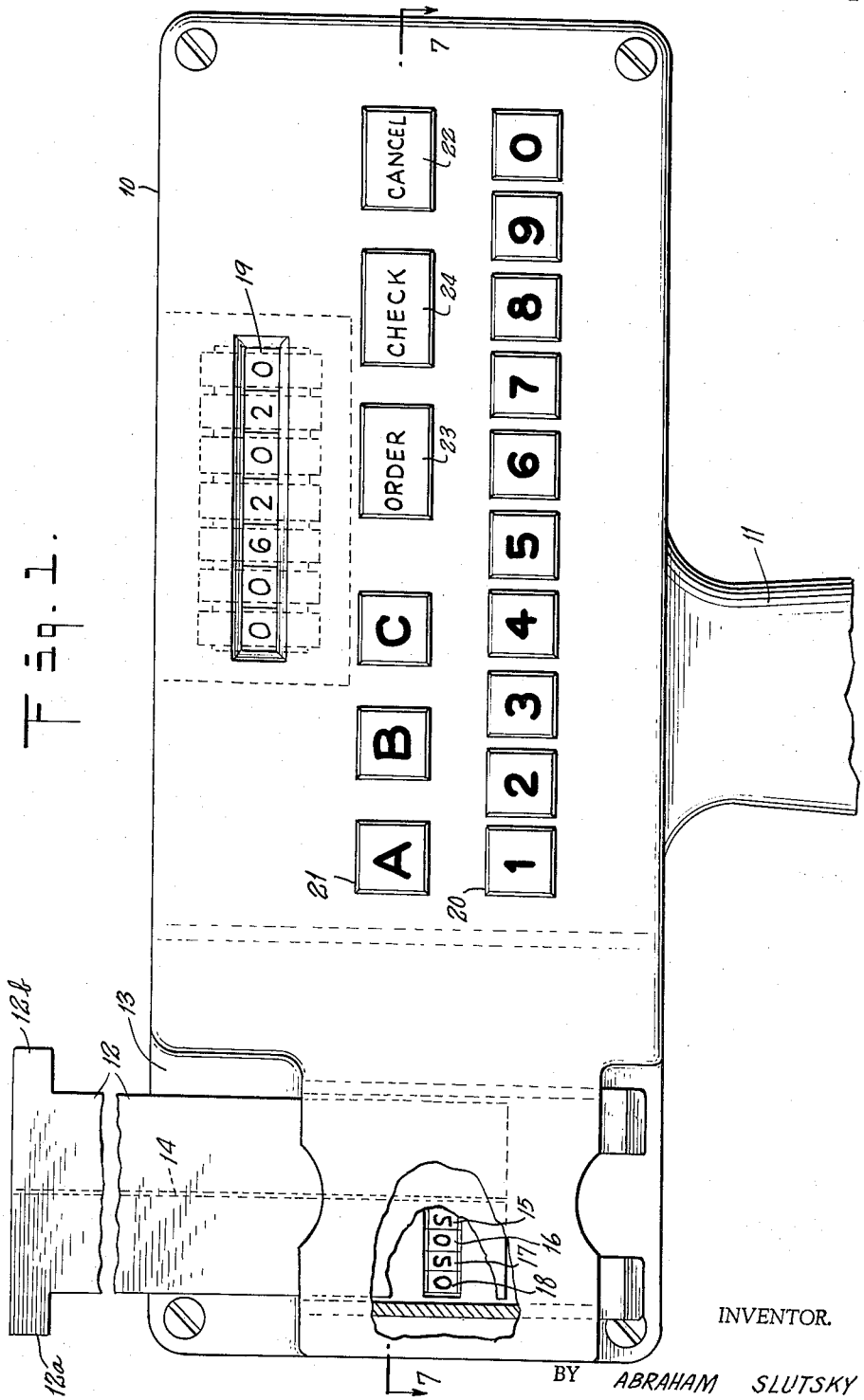
INVENTOR.
BY ABRAHAM SLUTSKY
Ward, Neal, Haselton, Orme + McElhannon
ATTORNEYS

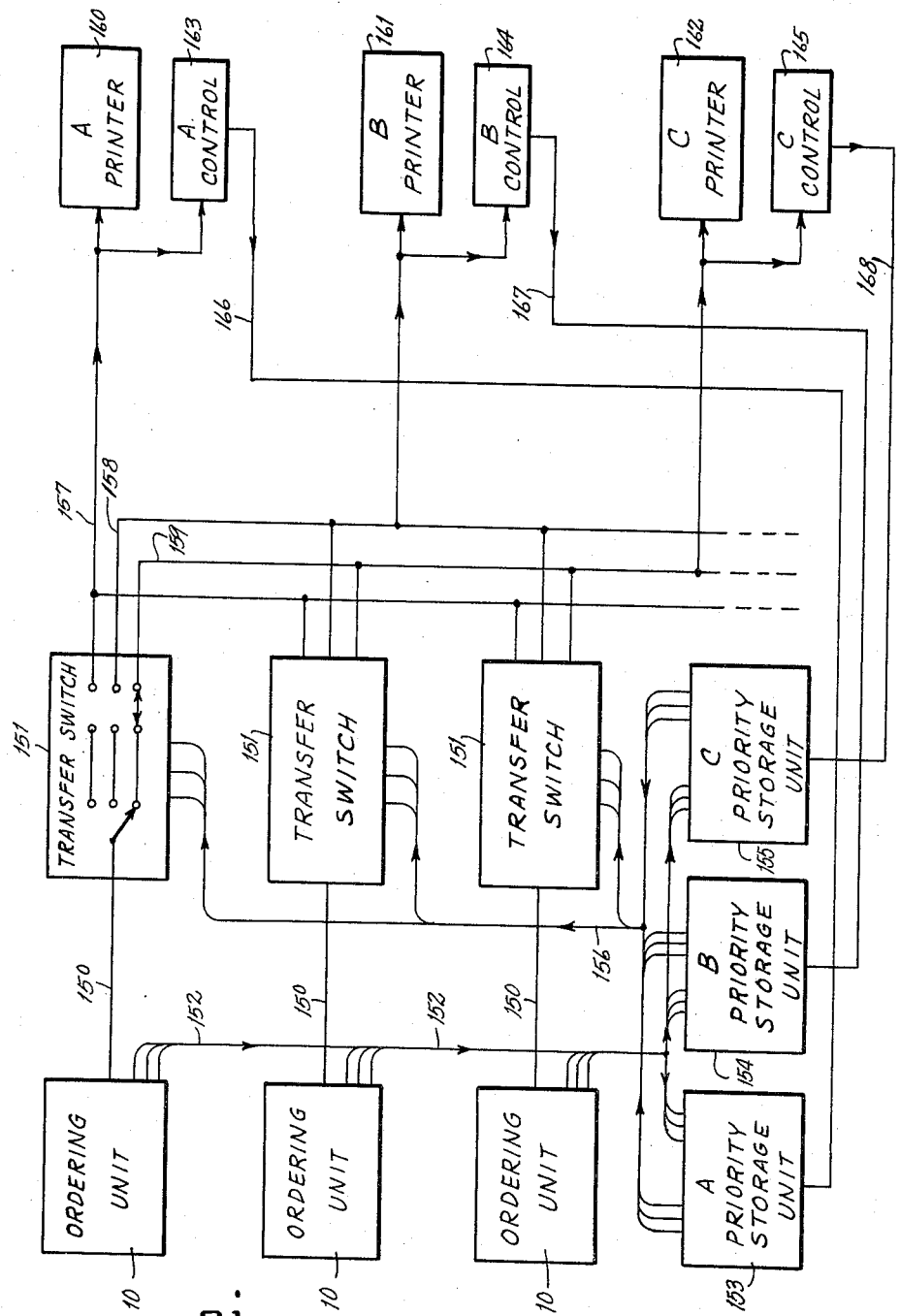

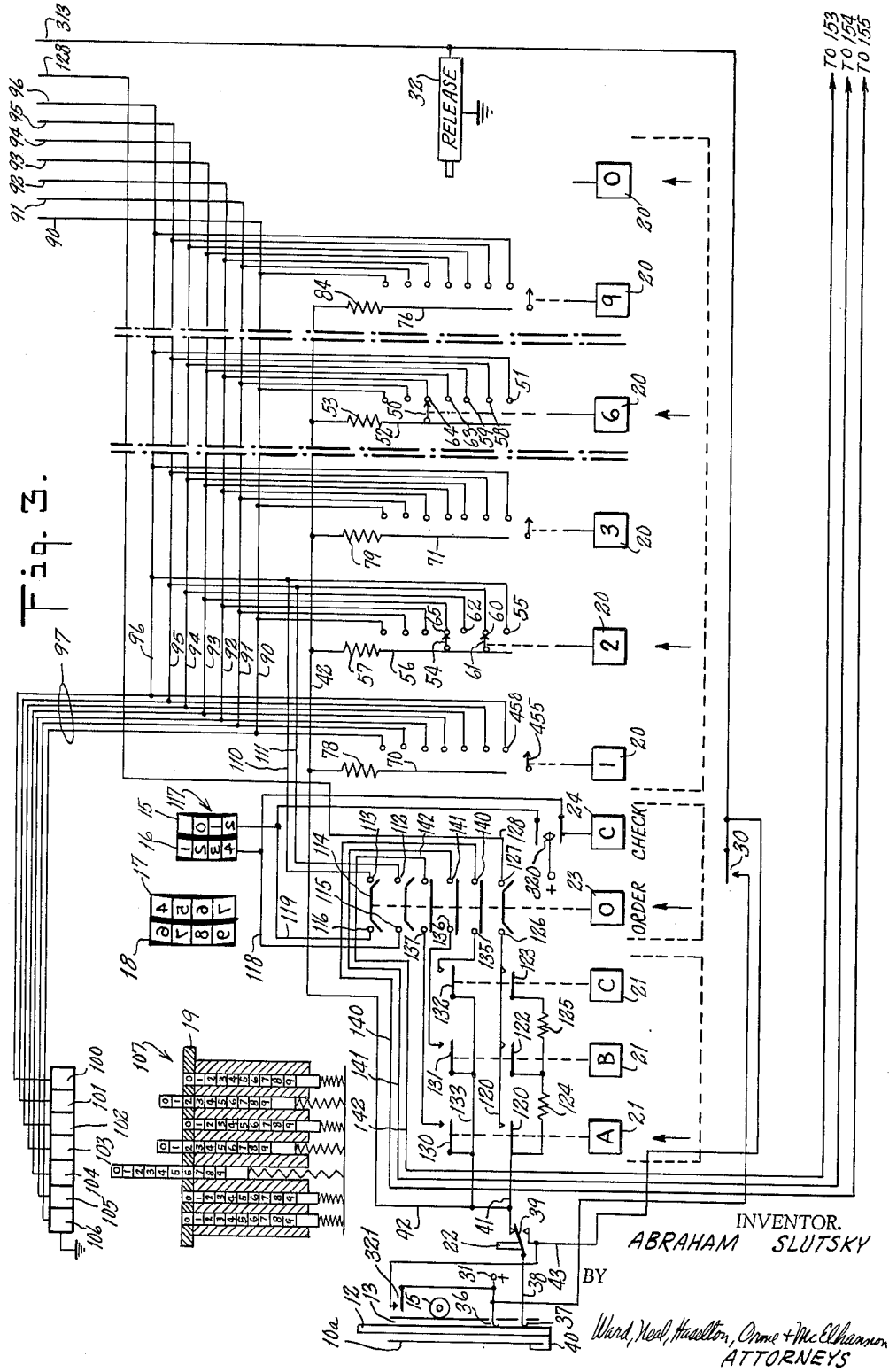

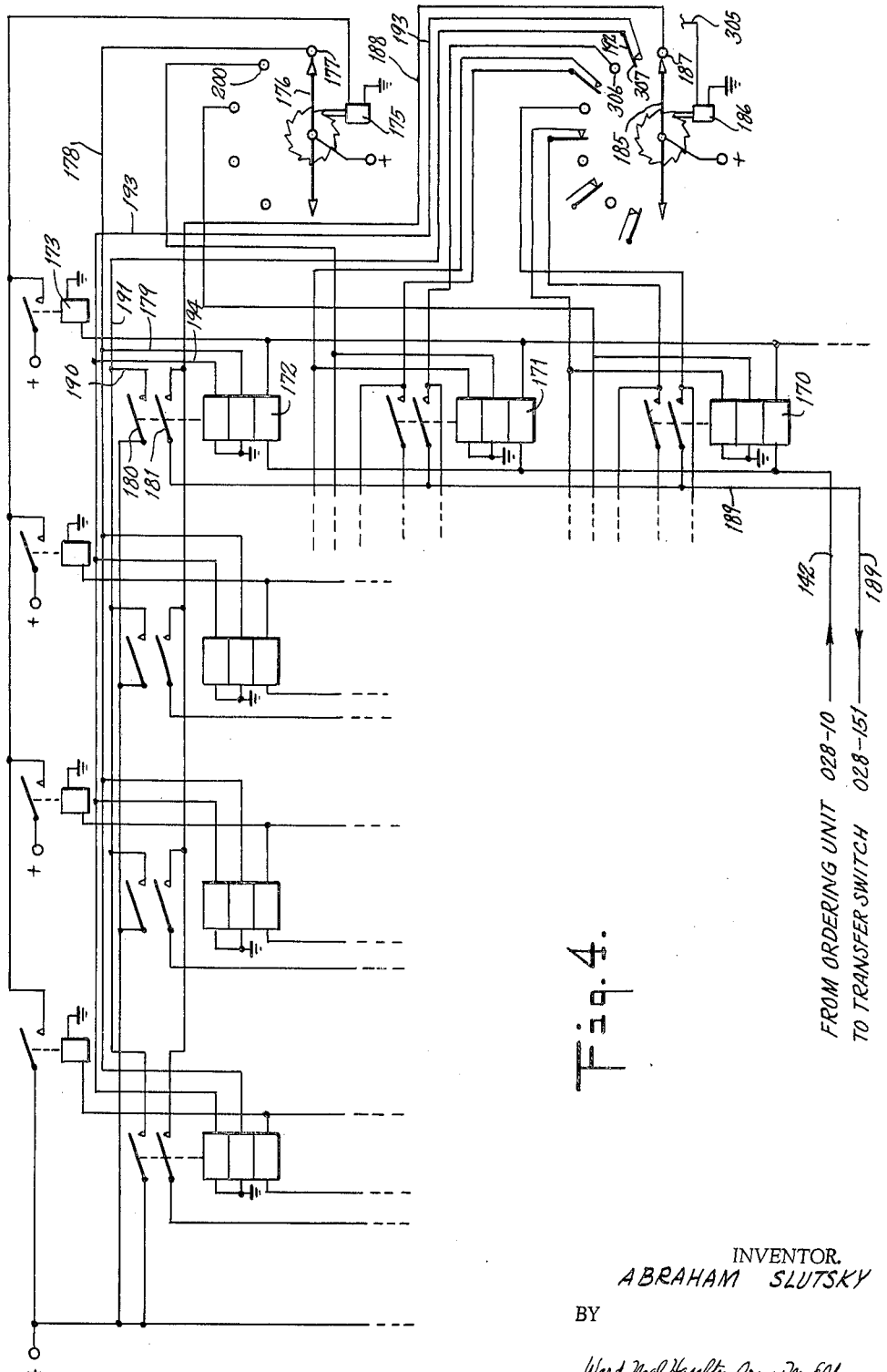

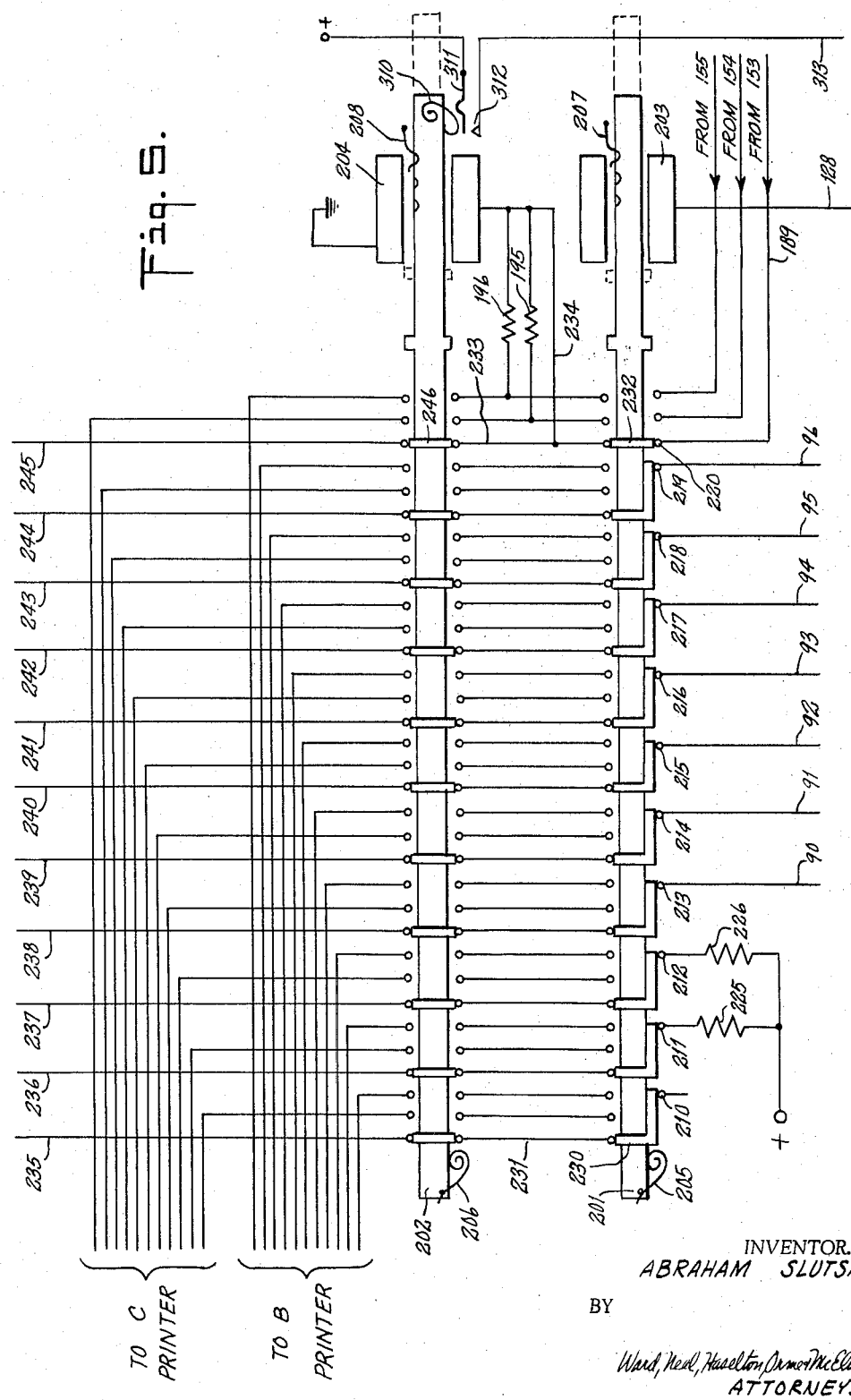

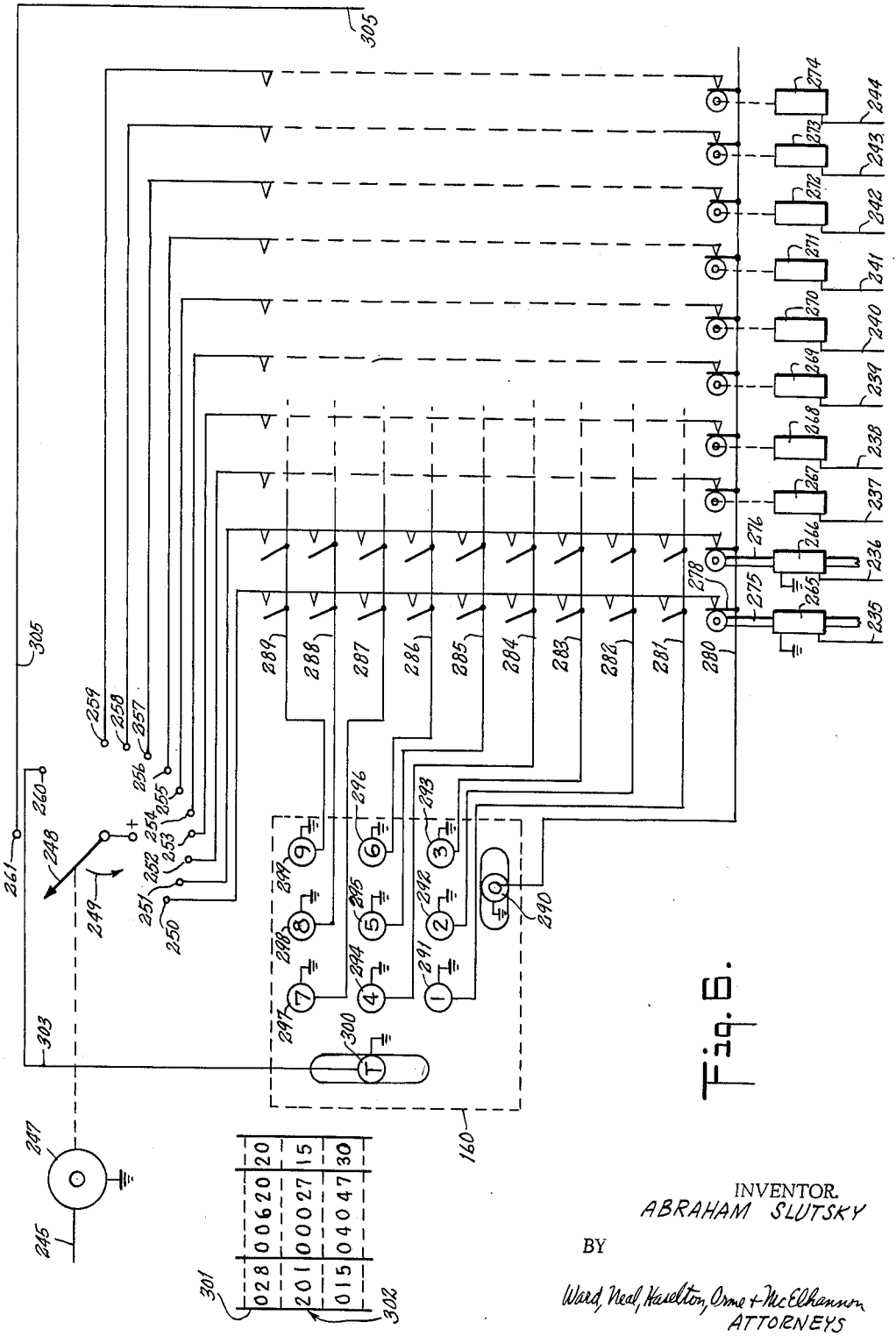

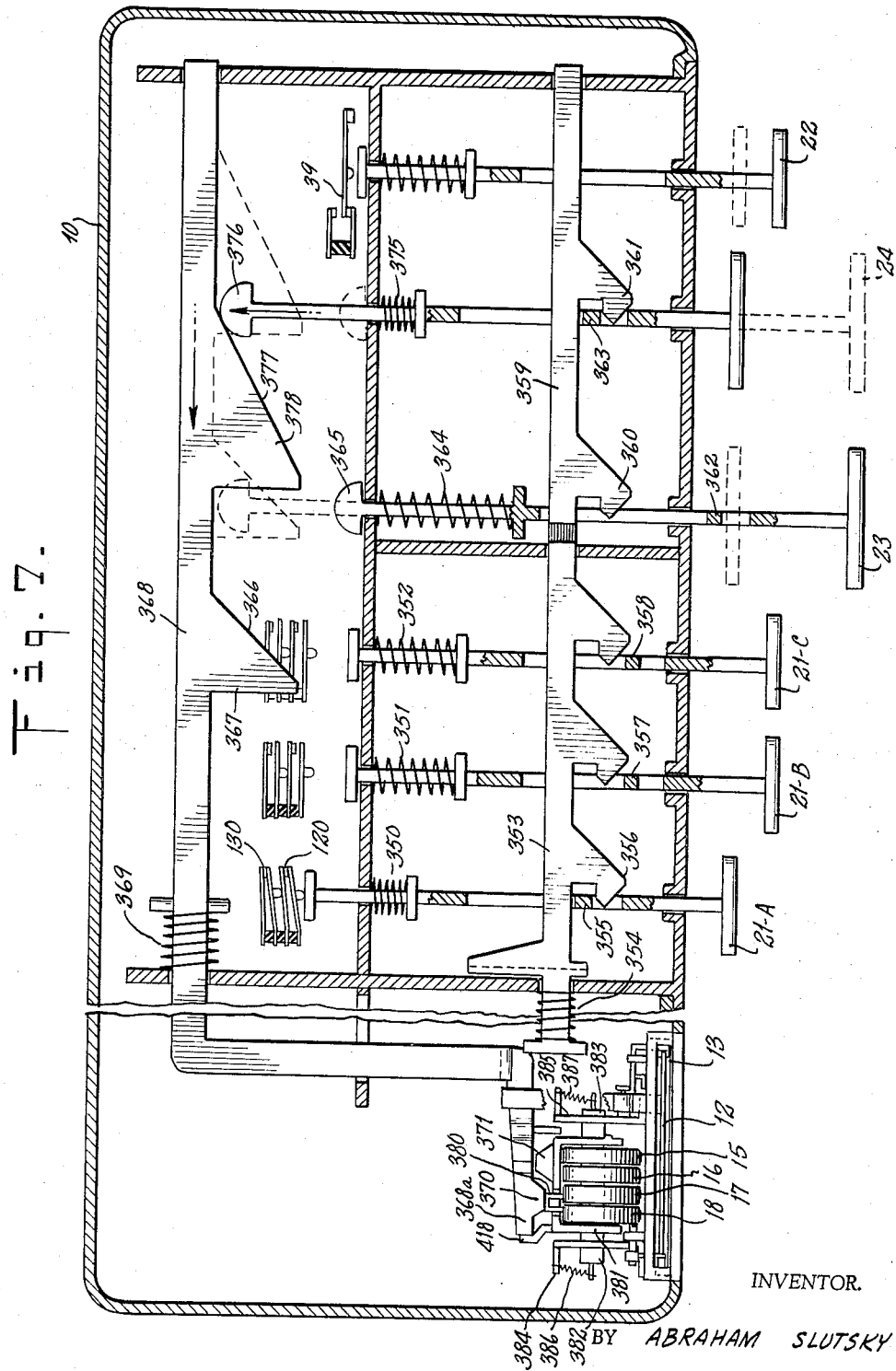

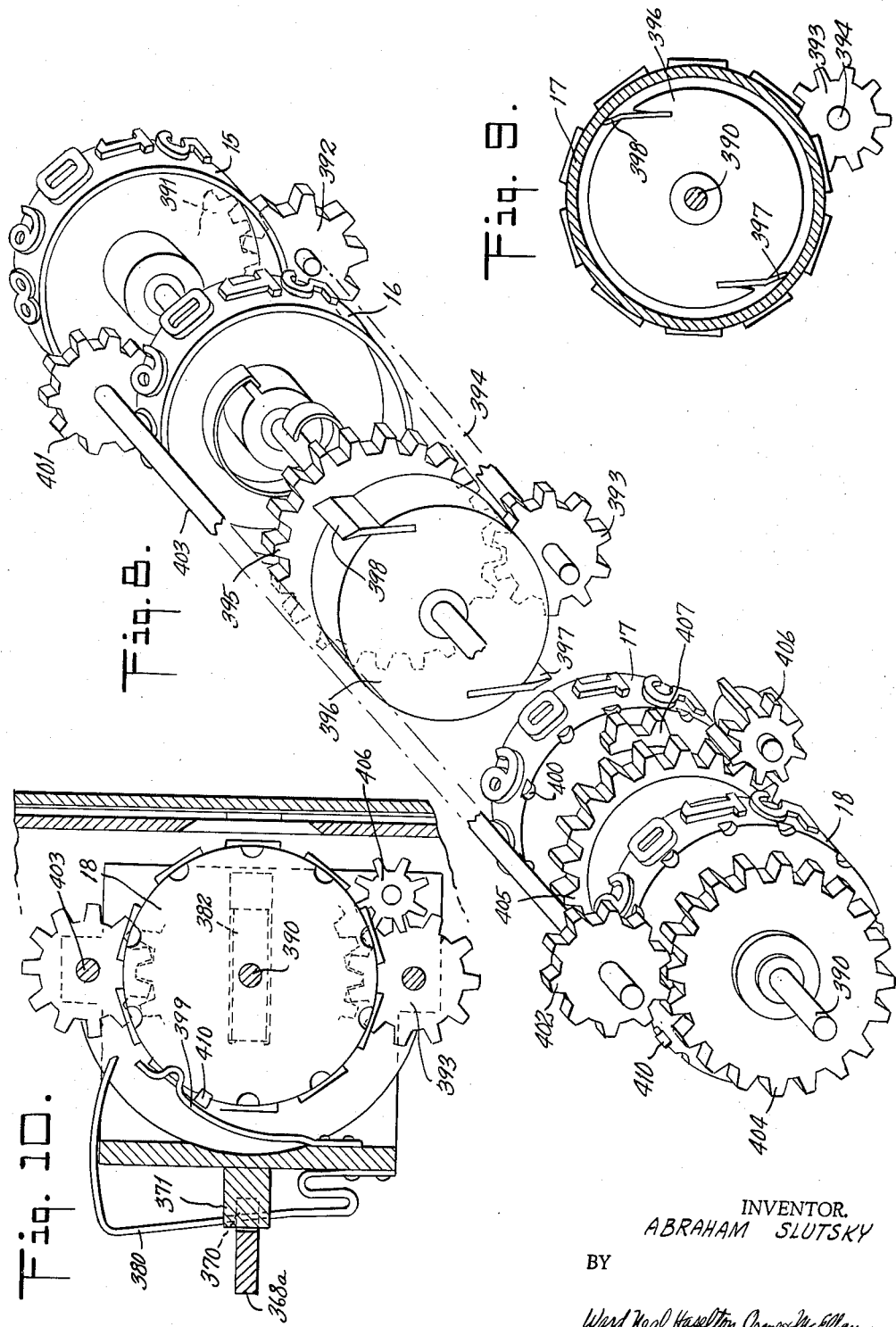

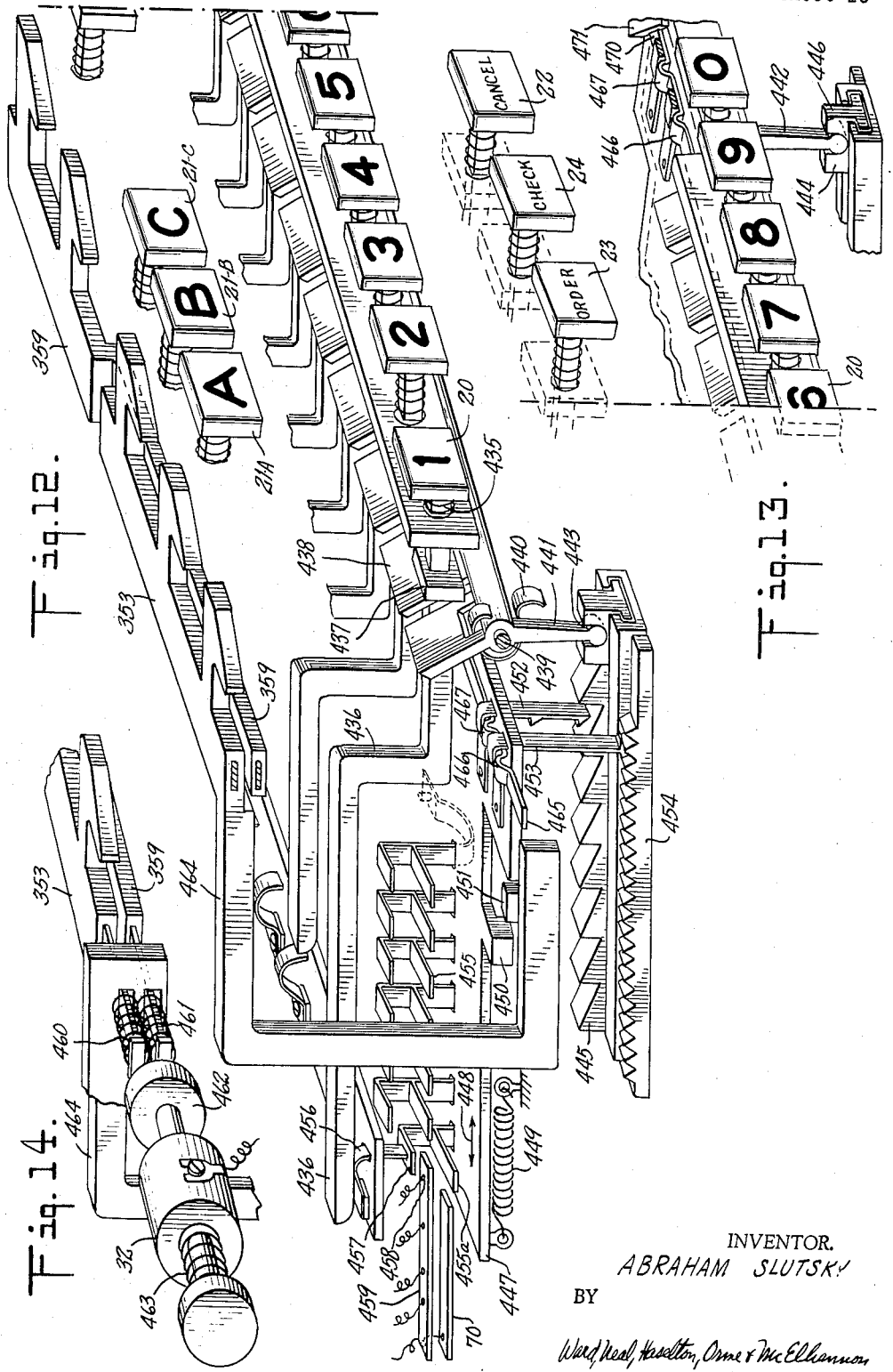

United States Patent Office 3,237,198
Patented Feb. 22, 1966

3,237,198
MULTIPLE POSITION ORDERING APPARATUS
Abraham Slutsky, 41—43 39th Place,
Long Island City, N.Y.
Filed Dec. 28, 1961, Ser. No. 162,675
8 Claims. (Cl. 346—17)

This invention relates to apparatus for ordering materials from positions remote from where the materials are kept and relates particularly to apparatus for ordering food from various positions in a restaurant.

The invention will be described as it may be employed for the ordering of food by customers in a restaurant, but it will be understood that the invention has application to other uses having similar requirements, such as the ordering of materials from stock in a warehouse, the ordering of goods in a department store or food market, etc.

In a restaurant in which food is ordered by and delivered to a seated customer, a substantial number of personnel must be provided because of the time required for order taking, delivery of the food and providing items which are needed by all or many of the customers. Thus, a waiter (or waitress) writes down the order with the many specific requirements of the customer, such as the type of bread and its manner of preparation, e.g., toasted, the condiments to be applied, e.g. mustard, mayonnaise, etc., the kind of potatoes, etc. The waiter then delivers the order directly or indirectly through another employee or employees to the place or places where the food is prepared which may mean trips to two or more places, such as, the hot plate counter, the sandwich counter, the salad counter, the beverage counter, the dessert counter, etc. Either before or after the food is ordered or ready the waiter provides the customer with items such as silverware, water, napkins and may also provide sugar, ketchup, mustard, relish, etc. The waiter delivers the food ordered to the customer and may have to repeat the process for the same customer in the event that beverage and dessert were not ordered initially. After all the food (which term will hereinafter include beverages unless otherwise specified) is delivered to the customer, the waiter adds up the charges and submits the bill or check to the customer.

It will be apparent that it is not economically practical in most instances to provide a waiter for each customer particularly since one of the most important cost items in operating a restaurant is the salaries of the employees. Attempts have been made, in the interest of providing better service or permitting a waiter to serve a greater number of customers, to accomplish several of the foregoing functions by the use of lower paid employees such as bus boys, delivery boys, etc. However, the time consuming functions of taking the order and adding up the charges have not been eliminated by using such employees and in addition, employees are still required even though the waiter's duties have been lessened.

Systems have heretofore been proposed in which the seated customer places a food order by pressing buttons which operate indicators at the place where the food is prepared. Such systems have not been well received because of several disadvantages. For example, they have required a separate indicator for each customer at the food preparation place and they have not provided for routing of the order to different preparation places. Thus, for a restaurant of practical size for such a system, a large number of indicators is required at a place which has little room for such indicators and not all indicators can be located within easy view of the food preparer. In addition, when there is a number of unfilled orders, the food preparer is not given any indication as to which order should be prepared first so that delivery of an order may be delayed or may be made out of sequence. Most such systems also require a different button for each item of food to be prepared making the selection limited if the ordering device containing the buttons is not to be impractically large and if the interconnecting means, such as wires, are not to be prohibitively expensive or large. Also, such systems do not automatically provide a bill or check for the food delivered.

In accordance with the present invention, a small number of push buttons are located at each position adjacent the space to be occupied by a customer. The combination of buttons pressed determines the order placed and preferably operates a single indicator for all customers at the food preparation place. In the preferred embodiment of the invention, the order is printed at the food preparation place so that the orders appear plus seat number and price of item on a paper tape or other printing medium in the sequence in which orders are placed. Also, in the preferred embodiment of the invention, different foods are prepared at different places and there is an indicator at each place which prints orders from all customers for food prepared at the place where the indicator is located. The combination of buttons pushed determines which of the indicators is operated so that only orders for the food prepared at each place appears on each indicator even though one customer may, in a complete order, require food from different places.

In the system of the invention, the food may be delivered manually from the preparation place to the customer and the bill or check for the food delivered may be made out by the personnel delivering the food. However, in accordance with a further feature of the invention, the push buttons at the customer's position, when operated, print the charges for the food ordered on a check associated with the push buttons and preferably, also add up the charges prior to removal of the check from the ordering unit by the customer.

The objects and advantages of the invention will be further apparent from the following detailed description of the manner in which I now prefer to practice the invention which description should be considered in conjunction with the accompanying drawings, in which:

FIG. 1 is a front elevation view of a preferred ordering unit forming part of the invention;

FIG. 2 is an electrical block diagram of the preferred embodiment of the invention;

FIG. 3 is a partly schematic, circuit diagram of the portion of the preferred embodiment associated with the ordering unit shown in FIG. 1;

FIG. 4 is a circuit diagram of a priority storage unit;

FIG. 5 is a circuit diagram of a transfer switch;

FIG. 6 is a circuit diagram of a printer and control circuit therefor;

FIG. 7 is a schematic, cross-sectional view of the ordering unit shown in FIG. 1 and is taken along the line 7—7 indicated in FIG. 1;

FIG. 8 is an enlarged, schematic, fragmentary, exploded, perspective view of the price printing wheel assembly;

FIG. 9 is a side elevation, cross-sectional view of a portion of the assembly shown in FIG. 8;

FIG. 10 is a side-elevation, cross-sectional view of the price printing wheel assembly;

FIGS. 12–14 are schematic, enlarged, perspective front views of portions of the ordering unit shown in FIG. 1.

Figure 11:
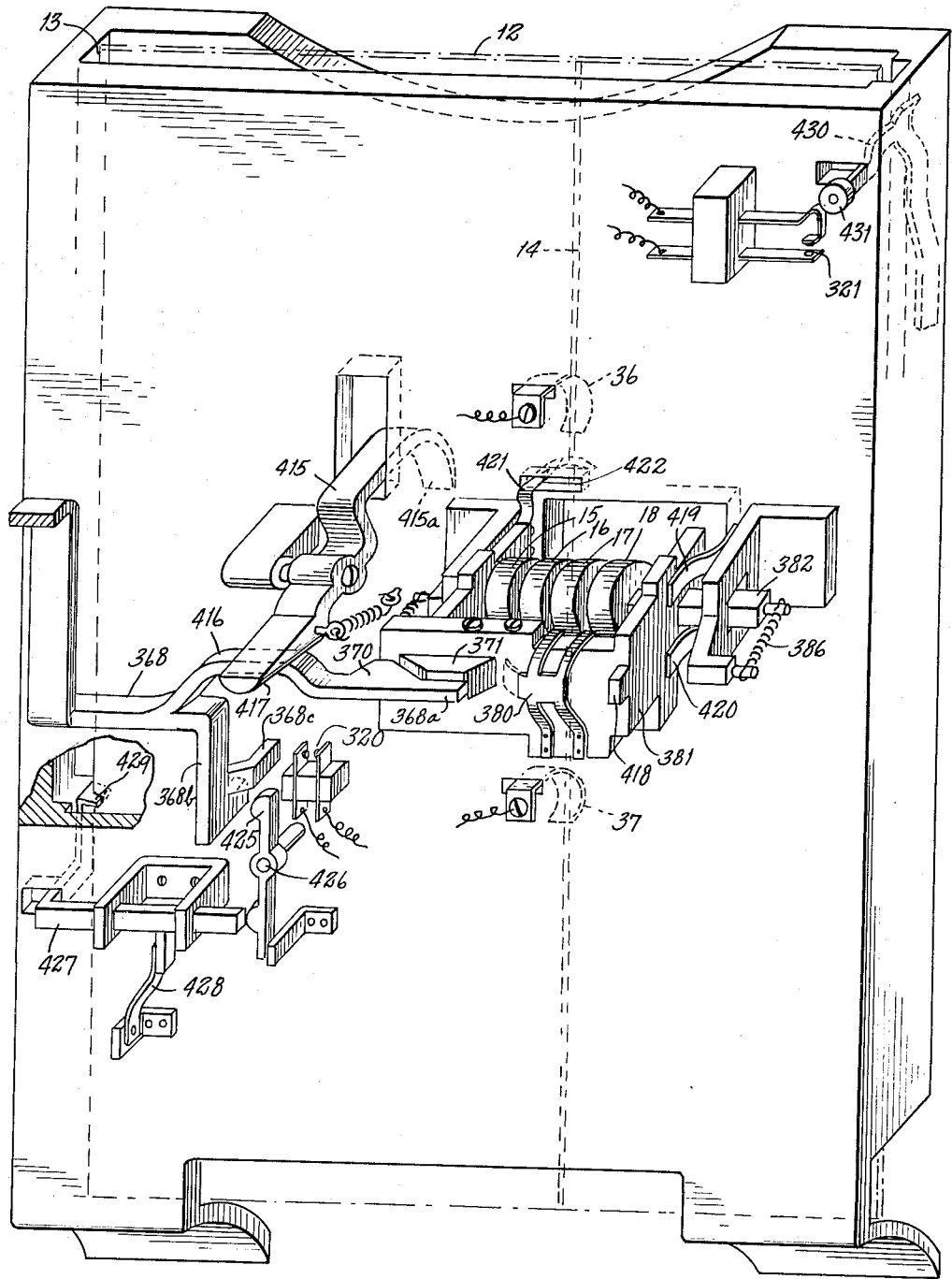
FIG. 11 is a schematic, enlarged, perspective rear view of a portion of the ordering unit shown in FIG. 1.

FIG. 1 illustrates a preferred form of the customer ordering unit 10 mounted on a pedestal 11 which may be supported from a counter, table, or other device at which a customer sits. One such unit 10 is provided in front of each customer's seat and is connected by wires, which may extend through the pedestal 11, to the circuits hereinafter described. Materials commonly used by each customer, such as silverware, napkins, condiments, etc., may be disposed in conventional devices adjacent each unit 10 or between alternate pairs of units and so that they are accessible to each customer. If desired, paper cup dispensers and a cold water faucet may be similarly disposed adjacent or between alternate pairs of the units 10 so as to be accessible to each customer and so that each customer may obtain his own drinking water.

Upon entering the restaurant the customer obtains a check 12 from the cashier or a conventional check dispensing machine and, after arrival at a vacant seating position, inserts the check 12 in the slot 13 of the ordering unit 10 the check 12 having a pair of ears 12a and 12b which limit the ultimate movement of the check 12 downwardly in the slot 13. The check 12 may be made of any material suitable for the purpose, such as stiff paper, but it is specially treated if the preferred embodiment of the invention is used. Thus, the check 12 has on the backside thereof as viewed in FIG. 1, a conductive carbon strip 14 which completes certain electrical circuits hereinafter described after the check 12 has been inserted in the slot 13 to permit ordering by use of the ordering unit 10. The check 12 is also treated on the backside thereof in a conventional manner to permit printing thereon by the pressure of printing wheels 15–18 if it is desired to have the code numbers of the items ordered and/or the price thereof printed on the check 12. Such treatment of the surface of the check 12 for the purpose of receiving printing by virtue of the pressure printing wheels 15–18 thereof is well known in the art, and the surface may, for example, have a coating of minute capsules of dye in the manner described on page 41 of "Science Digest" for June 1961. When the capsules are ruptured by the pressure of the printing wheels 15–18, the numbers on the surface of the wheels are reproduced visibly on the surface of the check 12.

The code number of the food item ordered and the price thereof in five cent units is indicated by the numbers appearing in the window 19 in the face of the ordering unit 10. The customer is provided with a menu which has each food item identified by a code number and the price thereof. Thus, the numbers appearing in the window 19 in FIG. 1 indicate that the customer has ordered an item having the code number 0062020, the first five digits being arbitrarily selected and the last two digits indicating the price in five cent units, the price in this case being $1.00 (20×$.05). It will be apparent that because of the large number of possible combinations of the first five digits, the menu may contain as many as 299,997 different items.

The numbered buttons 20 appearing at the lower right-hand portion of the ordering device 10 are pressed in accordance with the code number of the item on the menu which it is desired to order. Thus, the code number of the item corresponding to the numbers shown in the window 19 in FIG. 1 would be 62020. For reasons explained hereinafter, it is not necessary to use the first two zeros appearing in the window 19 as part of the code number of the item, and it is unnecessary for the customer to press the button marked "0" to cause the initial two zeros to appear in the window 19 when the item having code number 62020 is ordered. Accordingly, when the customer orders this item he merely pushes first the button marked with the number "6," then the button marked with the number "2," the button marked "0," the button marked "2" and finally the button marked "0."

If all the items on the menu were prepared at a single place, it would be unnecessary to have the bottons 21 marked with the letters A, B and C. On the other hand, it is customary in restaurants of the size where the systems of the invention would be employed to prepare different items at different places and the buttons labeled A, B and C are employed for routing the order to the indicator at the food preparing place where the item ordered is prepared. For example, sandwiches and salads may be prepared or be available at one place, beverages and dessert may be prepared or be available at a second place and hot plates may be prepared or available at a third place. Accordingly, the code number of the item ordered may have a suffix A, B or C which means that after the customer has pressed the buttons 20 corresponding to the numerals of the code number he will then press the button 21 bearing the letter corresponding to the suffix letter of the code number. Operation of the button 21 causes the previous part, or numerical part, of the code number to be routed to the preparation place corresponding to the letter button 21 which is operated. For example, operation of the button marked with the letter "A" may cause the code number 0062020 to be indicated on the indicator at the sandwich preparation place, and operation of the buttons labeled B and C would cause the number to be indicated on the corresponding other indicators.

After the buttons corresponding to the code number of the material or food desired have been operated by the customer, he can then check the numbers appearing in the window 19 to determine whether or not he has operated the buttons properly. The letters A, B and C may also be indicated at the window 19 in the same manner that the numerals are indicated thereat, but for the purposes of simplification they may be omitted not only because it is less likely that the customer will make a mistake among three letters when only one letter forms part of the code, but also because even if the code number is received at the wrong indicator it may be transferred by the restaurant personnel to the proper food preparation place. To facilitate identification of incorrect code numbers, the code numbers may be chosen so that all numbers related to food to be prepared at a given place are within a predetermined range, e.g. 1 to 1999 for one place, 2000 to 4999 for another place, etc.

If the numbers appearing at the window 19 are incorrect, then the customer presses the cancel button 22 which resets the ordering unit 10 and the associated circuits. The customer then represses the appropriate buttons until the correct code number appears at the window 19. After the correct code number appears at the window 19, the customer then presses the order button 23 which causes operation of electrical circuits hereinafter described and of the indicator devices or units at the food preparation places.

In the preferred embodiment of the system, each ordering unit 10 is assigned a position number and this position number appears at the indicator unit at the food preparing place along with the code number of the food item ordered. However, it is unnecessary for the customer to press buttons corresponding to the position number because the position number appears at the food preparation place indicator automatically. In the description hereinafter given it will be assumed that the ordering unit 10 at position number 28 is the one at which a customer places the food order.

As mentioned previously, the indicator at the food preparing place preferably includes a printer which prints the position number at which the order was placed and the code number of the item ordered. Such information may be printed on a paper tape, which may be perforated for ease in tearing and which may have a pressure sensitive adhesive on the back surface thereof, and the portion of the tape bearing the information may be torn off and placed on the plate or other container which bears the food ordered. Alternatively, the food preparer may have numbered tickets corresponding to the numbers of the customer positions and place such tickets on the food ordered from the various positions. The food may be then carried by employees whose only duties may be to carry such food to the proper positions. Such employees may be relatively unskilled, and if desired, they may have other duties requiring little skill such as removing dirty plates, cups, silverware, etc. from the counters or tables and replenishing the supplies thereof.

Certain of the units 10 may be employed for placing outgoing orders and the personnel at the food preparation place receiving orders from such units will know from the position numbers that the food is to be wrapped or otherwise processed for outgoing purposes.

If a customer orders food which is unavailable, the personnel at the food preparing place may so mark a ticket or slip bearing the customer position number and food code number, and such ticket or slip will be delivered to the customer, thereby notifying the customer that the food is unavailable and also providing the customer with evidence that the price of such food should be deducted from the charges on the check 12 if such are printed thereon.

When the customer has finished eating or ordering, he may then press the "check" button 24 which, in the preferred embodiment of the invention, causes the total cost of the food ordered to be printed in terms of five cent units on the reverse side of the check 12 and which permits withdrawal of the check 12 from the slot 13, it being noted here that once the check 12 has been inserted in the slot 13 it cannot be withdrawn therefrom until after the "check" button 24 has been pushed. When the check button 24 is pushed or shortly thereafter, the carbon strip 14 is marked or scribed so as to make it substantially nonconducting across the point at which it is marked. In this way, the check 12 cannot be reused after the button 24 has been operated.

Further details of the mechanical construction and arrangement of the ordering unit 10 will be described hereinafter, but in order that the purposes of the various mechanical arrangements may be more clearly understood, attention will now be directed to the various electrical circuits operated by the ordering unit 10.

FIG. 2 is a block diagram of the preferred embodiment of the invention which provides for printing of the orders at the place of preparation and printing of such orders in sequence according to the priority thereof. In the block diagram of FIG. 2 only three ordering units and three places of preparation of the food are shown, but it will be apparent that the invention is equally applicable to a greater or smaller number of ordering units or to a greater or smaller number of food ordering places.

Each of the ordering units 10 is connected by lines 150 to transfer switches 151, there being one transfer switch 151 for each ordering unit 10. The ordering units 10 are also connected by lines 152 to the priority storage units 153–155. The transfer switches 151 are controlled by the priority storage units 153–155 by way of lines 156 and the outputs of the transfer switches 151 are connected by the lines 157–159 to the inputs of the printers 160–162 and to the inputs of the printer control units 163–165. The control units 163–165 are connected respectively by lines 166–168 to the priority storage units 153–155.

After the customer has pressed the buttons at the ordering unit 10 as described above, certain electrical information is supplied by way of the lines 150 to the transfer switch 151. Operation of one of the buttons 21 sets up certain circuits in one of the priority storage units 153–155 by way of the lines 152, the particular priority storage unit 153–155 in which the circuit is established being dependent upon which one of the buttons 21 is operated. If it is assumed that button 21–A is operated, then the circuit will be established in the unit 153. If at the time that the circuit is established in the unit 153 the printer 160 is not busy, the unit 153 will cause immediate operation of the transfer switch 151 thereby transferring information as to the customer position number and food item and price code number to the printer 160.

If the printer 160 is in use at the time that the circuit is established in the unit 153, then the unit 153 will continue to maintain the circuit until it receives a signal from the control unit 163 indicating that the printer 160 is free at which time the unit 153 will operate the transfer switch 151 and thereby cause operation of the printer 160. Since the printer 160 operates rapidly there will be little delay between the time of operation of the ordering unit buttons by the customer and the time that the order is printed at the printer 160. On the other hand, at peak times, several orders to be printed by the printer 160 may be placed substantially simultaneously and the priority storage unit 153 will store such orders in the order that they are received and will cause printing of the orders by the unit 160 in the order which they were received at the unit 153. Due to the speed of operation of the printer 160 and the storage unit 153, it is unnecessary to be able to store orders for all installed ordering units 10 simultaneously. Instead, the storage units 153–155 may have a smaller storage capacity such as five to ten orders each.

If one of the printers 160–162 to which the order is to be routed is busy at the time that the order is placed at the ordering unit 10, it is not possible to place a second order at that unit 10 until after the order has been printed at the proper printer 160–162, a release signal from the associated control unit 163–165 being necessary to release the transfer switches 151 and the switches of the ordering units 10.

In the description set forth hereinafter only one ordering unit 10, one transfer switch 151, one of the priority storage units 153–155, one of the printers 160–162 and one of the control units 163–165 will be described in detail since the operation and construction of the remaining units are the same.

Referring now to the left-hand portion of FIG. 3 it will be seen that the portion of the ordering unit 10 containing the slot 13 is designated by the reference numeral 10a and the check 12 and the price printing wheel 15 are shown schematically. When the check 12 is initially inserted in the slot 13, it momentarily closes contacts 30 which complete an obvious circuit from the positive potential terminal 31 to the release solenoid 32 shown at the right of FIG. 3. It will be assumed herein that the negative terminal of the direct current power source is connected to ground. The purpose of the contacts 30 and the operation thereof is to clear the circuits and release the buttons on the ordering unit 10 which may have been operated without the presence of a check 12 in the slot 13.

As the check 12 is pushed further downwardly in the slot 13, the carbon strip 14 (FIG. 1) on the back thereof interconnects the contact 36 and 37 riding on said check 12 and completes an energizing circuit from the positive terminal 31 to the lead 38 which connects to the switch 39 operable by the cancel button 22. When the bottom of the check 12 reaches the detent 40 it cannot be further pushed into the slot 13.

The switch 39 is normally closed so that it supplies positive potential to the leads 41 and 42. However, when the button 22, is pressed, the switch 39 is connected to the lead 43 so that positive potential is thereby supplied to the release solenoid 32. In this way, the circuits and the buttons which have been operated may be released by operation of the cancel button 22.

The numbered button 20, that is the buttons 20 which are marked with the numbers 1 through 0 (the buttons marked 4, 5, 7 and 8 being omitted in FIG. 3 for simplicity but being identical in arrangement and operation as the other numbered buttons 20) are mechanically interconnected as hereinafter described so that when a second numbered button 20 is pushed after another numbered button 20 has previously been depressed, the switch associated with the previously depressed number button moves one step in relation to the contacts associated therewith. The button 20 marked with "0" does not have a switch associated therewith but is similarly mechanically interconnected with the other buttons 20 to provide a switch stepping function hereinafter described. The button 21 marked with the letters A, B and C are mechanically interconnected as hereinafter described so that only one of these buttons 21 can be pushed at a given time. Thus, if button A has previously been pushed, operation of the button marked B will release the button marked A. Similarly, operation of any one of the buttons 21 will release any other button 21 which has previously been pushed. The order and check buttons 23 and 24 are similarly interconnected.

Let it be assumed that the customer wishes to order the item identified with the code number 62020A. The buttons 20 will hereinafter be identified by their principal reference number 20 separated by a dash from the number marked thereon. Similarly the various buttons 21 will be identified by their principal reference numeral 21 separated by a dash from the letter marked thereon. The customer first presses button 20–6 which causes movement of a switch arm 50 into engagement with a contact 51. The switch arm 50 bears against a bar 52 which is connected through a resistor 53 to the lead 42 which is at positive potential.

The customer next pushes the button 20–2 which causes its associated switch arm 54 to engage the contact 55 thereby interconnecting the contact 55 through the bar 56 and the resistor 57 to the positive potential lead 42. At the same time that the button 20–2 causes movement of its associated switch arm 54, the mechanical interconnection with the other buttons 20 causes movement of the switch arm 50 of the previously operated push button 20–6 and engagement of the arm 50 with the contact 58.

The customer then pushes the 20–0 button which has no switch arm associated therewith, but operation of the button 20–0 causes each of the switch arms 50 and 54 associated respectively with the buttons 20–6 and 20–2 to move into engagement with their next contacts so that at this time the switch arm 50 engages the contact 59 and the switch arm 54 engages the contact 60.

When the customer then pushes the button 20–2, a second switch arm 61 engages the contact 55 and the first switch arm 54 engages the contact 62. At the same time the switch arm 50 associated with the button 20–6 moves to the next contact 63.

When the customer then next pushes the button 20–0, the switch arms 50, 54 and 61 move into engagement with their next contacts so that they are in the positions shown in FIG. 3, the switch arm 50 engaging the contact 64, the switch arm 54 engaging the contact 65 and the switch arm 61 engaging the contact 66.

The remaining buttons 20 similarly have switch arms associated therewith which, when the buttons are operated, engage bus bars 70–76 interconnected with the positive potential lead 42 by resistors 78–84. The resistors 78–84, 53 and 57 have different values so that when the circuits are finally completed and current flows therethrough, the currents flowing through or applied to the contacts associated with the different switch arms have different values. In other words, the potentials applied to the contacts associated with the different switch arms are related to the numbers marked on the push buttons 20 so that each push button corresponds to a different potential.

The various contacts which are engaged by the various switch arms are connected in parallel to leads 90–96 which in turn are connected by leads 97 to the seven coils or solenoids 100–106 which form part of a conventional indicating device which indicates the magnitude of the potentials applied thereto by virtue of numbered scales indicated schematically by the reference numeral 107. It is these numbered scales 107 which appear in the window 19 illustrated in FIG. 1. Accordingly, the scales 107 move to positions determined by the potentials applied to the leads 90–96 which in turn are determined by the operation of the push button 20 heretofore described. Accordingly, if the customer has properly operated the push buttons 20, the numerals 0062020 appear in the window 19. If the numbers appearing in the window 19 are incorrect the customer operates the cancel button 22 heretofore described which resets the buttons 20 and the customer then presses the buttons 20 in the proper sequence.

By virtue of the leads 110 and 111 the leads 95 and 96 are connected respectively to the terminals or contacts 112 and 113 on the order switch 114 associated with the order button 23. Accordingly, the potentials on the contacts 112 and 113 will correspond to the potentials corresponding to the last two numbers appearing in the window 19, such numbers in the assumed case being the numbers 2 and 0. When the order button 23 is operated the terminals 112 and 113 are interconnected respectively with the terminals or contacts 115 and 116 which are connected by means of leads 118 and 119 to the operating coils of a conventional printing wheel assembly 117 containing the wheels 15 and 16. If the price of each item is not to be printed on the card 12, such wheels 15 and 16 and their connecting circuits may be omitted.

When the customer pushes the button 21–A, which is the button corresponding to the suffix letter at the end of the code number 62020A, the switch 120 associated therewith interconnects the lead 41 with the lead 121 applying the potential of lead 41 to the lead 121. Buttons 21–B and 21–C similarly have switches 122 and 123 associated therewith, but such switches 122 and 123 are connected to the lead 41 through resistors 124 and 125 so that if button 21–B or 21–C were pushed, the potentials applied to the lead 121 thereby would be lower than the potential applied to the lead 121 by the switch 120, and the potential applied to lead 121 by the switch 123 would be lower than the potential applied thereto by the switch 122. When the order button 23 is pushed, the switch 114 associated therewith interconnects the contact 126 which is connected to the lead 121 with the contact 127 connected to the lead 128, the lead 128 being connected to the operating coil of a transfer switch 151 hereinafter described and shown in FIG. 5.

Buttons 21–A, 21–B and 21–C also operate respectively switches 130–132 which connect the lead 133 at the potential of the lead 42 to contacts 135–137 of the order switch 114 operated by the order button 23. Since it was assumed that button 21–A was operated the order switch 114 will apply positive potential to a lead 142 by the one-way wiping arm on the switch 114 which extends to the "A" priority storage unit 153 illustrated schematically in FIG. 4.

Referring to FIG. 4, it will be seen that lead 142 is connected to one coil of each of a plurality of relays 170–172, the number of relays in the vertical row being determined by the number of orders which it is desired to store in a priority storage unit of such units 153–155 at any given time. In each of the storage units 153–155 there is one vertical row of relays for each customer position or customer ordering unit 10. It will be assumed that the vertical row of relays 170–172 at the right of FIG. 4 corresponds to the customer position No. 028.

Positive potential on the line 142 energizes the three lowermost coils of the relays 170–172 as well as the coil of relay 173. Although the relay 173 draws its armature up against the associated contact, the current through the coils of the relays 170–172 is insufficient in itself to operate the associated armatures. Operation of the relay 173 causes energization of the coil 175 of the stepping relay of which the coil 175 forms a part and movement of the associated arm 176 which is connected to positive potential as indicated. However, before arm 176 moves current flows by way of leads 178 and 179, arm 176 and contact 177 through the center coil of the relay 172, which current produces a field which adds to the field produced by the current in the lowermost coil of the relay 172. The result of the energization of the two coils of the relay 172 is operation of the two armatures 180 and 181 against their associated contacts. It will be noted that the center coils of the relays 170 and 171 are not energized, and therefore, their associated armatures do not pull up against the contacts even though their lowermost coils are energized.

Operation of the armature 181 completes a circuit from the arm 185 of the stepping relay having the energizing coil 186, which arm 185 is connected to positive potential as indicated and is in contact with the contact 187, the circuit extending from contact 187 by way of lead 188, armature 181 and lead 189 which connects to the second coil 204 of the transfer switch 151 shown in FIG. 5 through the connections hereinafter described.

Operation of the armature 180 completes a holding circuit through the upper coil of the relay 172 as follows: armature 180 which is connected to positive potential, leads 190 and 191, normally closed contacts 192, and leads 193 and 194, one side of the uppermost coil of relay 172 being grounded.

Shortly after energization of the relay coil 175 the circuit to the center coil of relay 172 is broken because the arm 176 moves to the contact 200. This de-energizes the center coil of the relay 172, but the armatures 180 and 181 remain against their contacts because of the locking circuit through the uppermost coil of the relay 172 heretofore described. The lowermost coil also is de-energized because the one-way wiping arm on the switch 114 has passed the contacts 137 and 142.

Referring now to FIG. 5, a typical transfer switch 151 there illustrated comprises a pair of armatures 201 and 202 operable respectively by relay coils 203 and 204. The armatures 201 and 202 are shown in FIG. 5 in their fully operated positions, that is, corresponding to the position assumed when the 21-A button in the associated ordering unit 10 has been depressed. Armatures 201 and 202 are returned to normal positions by springs 205 and 206, and the armatures 201 and 202 are precisely located by virtue of centering arms 207 and 208 which engage depressions in the sides of the armatures 201 and 202. As pointed out previously, operation of the button 21-A causes full positive potential to be applied to the lead 128 which in turn causes the armature 201 to move into the position shown in FIG. 5. If button 21-B were pushed, a lower potential would be applied to coil 203, and armature 201 would move only to its second position. Similarly, operation of button 21-C would cause the armature 201 to move to its first position.

Stationary contacts 210-220 are associated with the armature 201, and contacts 210-212 are employed to provide position information to the transfer switch 151 and hence to the printer to which the transfer switch is subsequently connected. Since the transfer switch in FIG. 5 corresponds to the customer position 028 the contact 210 is unconnected, that is, it is not connected to any potential source whereas contacts 211 and 212 are connected to the positive terminal through resistors 225 and 226 which will apply potentials to the contacts 211 and 212 which correspond to the numerals 2 and 8 respectively.

Contacts 213 through 219 are connected to the leads 90-96 which, as described above, have potentials thereon by reason of the operation of the ordering unit 10 corresponding respectively to the numerals 0062020. The conductive bars or strips on the armatures 201, such as the bar 230, interconnect the contacts 210 through 220 with the stationary connectors 231 dependent upon the position of the armature 201.

It has been assumed that at the time that the order button 23 was operated, the "A" printer 160 was not in operation and was ready for printing. Accordingly, shortly after the armature 201 reaches the position shown in FIG. 5, the lead 189 becomes energized with positive potential so that coil 204 is energized from lead 189 through contact 220, conductive bar or strip 232, connector 233 and lead 234, one side of coil 204 being grounded. Accordingly, armature 202 moves from a normal position to the position shown in FIG. 5, thereby causing the potentials on contacts 210 through 219 to be applied to the leads 235-244 connected to the "A" control unit 163 (FIGS. 2 and 6). If armature 201 were in its second position, coil 204 would be energized from the B priority storage unit 154 through a resistor 195, and hence at reduced potential, so that armature 202 would move only to its second position. Similarly, with armature 201 in its first position, coil 204 would be energized from the C priority storage unit 155 through a resistor 196 and armature 202 would move from a normal position to its first position.

At the same time, the conductive bar or strip 232 on the armature 201 interconnects the connector 233 with the lead 245 which thereby applies positive potential to the motor 247 (FIG. 6) which drives the contact arm 248 in the direction indicated by the arrow 249. When the motor 247 is de-energized, the contact arm 248 rests a substantial distance away from the contact 250, and accordingly, before the contact arm 248 engages the contact 250 and applies positive potential thereto, the coils 265-274 (FIG. 6) have been energized and have moved their associated armatures 275, 276, etc. to positions determined by the magnitudes of the voltages applied thereto by way of the leads 235-244. Each armature, such as the armature 275, comes to rest in a position such that it closes contacts 278 associated therewith, the armature 275 being in the position shown in FIG. 6 because no current is flowing in the coil 265. Accordingly, the contacts 250-259 are connected to the leads 280-289 in accordance with energization of the leads 235-244. Leads 280-289 connect to the energizing coils 290-299 of a conventional, electrically operable printing machine or printer 160, such as an electrically operable adding machine having a paper tape 302 issuing therefrom or to solenoid operated plungers for operating the buttons of such a machine. Thus, as the motor 247 drives the contact arm 248, the coils 290-299 of the machine 160 will be operated so as to imprint upon the tape the position number 028, and the code number 0062020 as indicated at 301 in FIG. 6.

Instead of printing the code number 0062020, the printer 160 may be provided with letter rather than number type, and the code may be so selected that the letters printed on the tape 302 will represent an abbreviated or coded spelling of the food item ordered, thereby simplifying reading of the orders by the personnel. For example, the coils 290-299 may cause printing of letters on the tape 302 even though the code used by the customer consists of numbers, and the letters HAMR, meaning a ham sandwich on rye bread, could be printed on the tape 302 even though numbered buttons 20 are pressed and the code on the menu consists of numbers, each number corresponding to a different letter.

When the contact arm 248 subsequently engages the contact 260, it applies positive potential by way of the lead 303 to the coil 300 causing the tape 302 to advance in readiness for the next operation of the printer. When the contact arm 248 engages the contact 261 it applies positive potential to the line 305 which is connected to the coil 186 of the stepping relay in the "A" priority storage unit 153 (FIG. 4) which causes the contact arm 185 thereof to move to the contact 306 and while moving from contact 187 to contact 306, the arm 185 engages the extension 307 on the contacts 192 momentarily opening the contacts 192 and thereby interrupting the holding circuit for the coil 172. Accordingly, the armatures 180 and 181 become disengaged from their associated contacts, and positive potential is removed from the lead 189 which de-energizes the coil 204 of the transfer switch (FIG. 5) which returns armature 202 to its normal position indicated in dotted lines. During its return to its normal position, the armature 202, which carries a one-way detent 310, causes the detent 310 to strike an arm 311 which closes a pair of contacts 312 which supply positive potential momentarily to lead 313 connected to the release solenoid 32 (FIG. 3) which return the switches and buttons of the ordering unit 10 to their released or normal positions. The detent 310 does not operate the arm 311 during movement of the armature 202 to the left as viewed in FIG. 5 so that the contacts 312 do not close during the movement of the armature 202 to the left.

When the switches and buttons of the ordering unit 10 are released, the numbers in the window 19 return to zero, the printing wheels 15 and 16 return to zero and the energizing circuit for coil 203 of the transfer switch is broken. At this time the ordering unit 10 is ready to be reused by the customer for the placement of a food order.

It will also be noted that when the armature 202 returns to its normal position, the energizing circuit for the motor 247 is broken at the armature 202 so that the motor 247 stops with the contact arm 248 thereof approximately in the position shown in FIG. 6.

Returning now to FIG. 4 it will be noted that the arm 176 moved from the contact 177 to the contact 200 shortly after the order button 23 on the ordering unit 10 at position 28 was depressed. If at this time the order button 23 of an ordering unit 10 at another position were depressed, the relay in the horizontal row corresponding to the relay 171 but in a different vertical row corresponding to the position at which the order button 23 was depressed, would be operated in the same manner as the relay 172 was operated, such operation being described above. Therefore, it will be apparent that as various buttons 23 are depressed at various customer positions, relays in successive horizontal rows will be operated in the same manner as the relay 172 is operated.

Similarly, as soon as the "A" printer 160 has completed the printing and the motor 247 has completed its cycle, the arm 185 of the stepping relay in the storage unit will move to the succeeding contact and cause reoperation of the "A" printer 160 in the manner described above. It will be apparent therefore that the printer follows closely behind the movement of the arm 176, and the arm 176 causes operation of the printer 160 in sequence determined by the sequence of placement of orders at the various ordering units 10. Hence, the orders will be printed on the tape 302 in the order which they are placed by the various customers.

It is submitted to be clear from the foregoing that the customer, by pressing the numbered buttons 20 on the ordering unit 10 (FIG. 1), sets up certain potentials on the contacts of an associated transfer switch 151, certain other contacts of such transfer switch 151 already having thereon certain potentials corresponding to the position number of the position with which the transfer switch 151 is associated. Then, by pressing the suffix letter button 21 and the order button 23, the customer sets the position of the armature 201 of the transfer switch 151 and establishes a storage circuit in the priority storage unit of the units 153, 154 or 155 corresponding to the button 21–A, 21–B or 21–C which has been operated. If the printer corresponding to one of the buttons 21 which is operated is then busy, the associated storage circuit prevents reoperation of the buttons on the unit 10 until the printer is free and can print on the tape 302 the position number of the position at which the customer placed the order and the code number of the food item ordered. After the information is printed at the food preparation place, the buttons on the ordering unit 10 are released so that the customer may then order another food item.

The number of food items which may be ordered depends upon the length of the check 12 and the number of items may for example be as many as 25 items. As each code number is printed on the tape 302 and the buttons on the unit 10 are released the check 12 moves downwardly one step by virtue of apparatus hereinafter described, and when the check 12 has reached its lowermost position, the carbon strip 14 will no longer extend between the contacts 36 and 37 (FIG. 3), and the ordering unit 10 will no longer be operative for the placement of orders. At such time the customer operates the check button 24 which releases the check 12 and disrupts the carbon strip 14 in a manner hereinafter described so that the check 12 cannot be reused. Accordingly, in order to place further orders the customer must obtain another check from the cashier who may make an appropriate notation on the second check given to the customer.

If the customer places all of his orders without exhausting the check 12, the customer thereafter merely presses the check button 24 which performs the following functions:

(1) Releases the order button 23 and switch 114.
(2) Moves check 12 downwardly one step.
(3) Presses the printing wheels 15–18 against the back of the check 12 thereby printing the total of the price units of the food item ordered and then disengages such wheels from the check 12.
(4) Causes a mechanical detent action hereinafter described and closes contacts 320 which energizes the coils for the printing wheels 15 and 16 and thereby returns the printing wheels 17 and 18 to their zero positions.
(5) Releases the detents which mechanically hold the check 12 in the slot 13.
(6) Scribes, and thereby interrupts, the carbon strip 14 on the reverse side of the check 12 so that the check 12 cannot be reused and withdraws scriber.

As the check 12 is removed from the slot 13, it momentarily closes switch contacts 321 which energize the line 43 controlling the release relay 32 which causes a release of the check button 24.

FIG. 7 is a partly schematic, cross-sectional, plan view of the ordering unit 10 shown in FIG. 1 and is taken along the line 7—7 indicated in FIG. 1. As illustrated in FIG. 7, the buttons 21–A, 21–B and 21–C are spring returned to their normal positions by means of springs 350–352, the button 21–A being shown in its depressed or operated position and buttons 21–B and 21–C being shown in their normal positions. The buttons 21–A through 21–C are mechanically interconnected by means of a bar 353 of a conventional type which bar 353 is urged to the left as viewed in FIG. 7 by means of a spring 354. Thus, as one of the buttons 21 is depressed, for example, 21–A, the projection 355 thereon engages an extension 356 on the bar 353 which causes the bar 353 to move to the right. As the projection 355 passes the end of the extension 356 the bar 353 returns to the position shown in FIG. 7 and prevents the button 21–A from returning to its normal position. Accordingly, the button 21–A will remain in its depressed condition or position until the bar 353 is again moved to the right either by operation of the relay 32 or operation of one of the other buttons 21, e.g., 21–B or 21–C. It will be noted that when either button 21–B or 21–C is depressed the corresponding projections 357 or 358 thereon engage extensions of the bar 353 causing the bar 353 to move to the right as viewed in FIG. 7 and thereby releasing any previously operated button 21.

When operated, the buttons 21 close the contacts adjacent the ends thereof, such as the contacts 120 and 130 illustrated in FIG. 3, the function of such contacts having been described heretofore in connection with FIG. 3.

The order button 23 and the check button 24 are similarly mechanically interconnected by a spring returned bar 359 which has extensions 360 and 361 thereon engageable with projections 362 and 363 respectively on the buttons 23 and 24. Thus, when either of the buttons 23 or 24 is fully depressed, it is retained in its depressed position by the bar 359 but only one of the buttons 23 and 24 can be depressed and retained in the depressed position at any one time.

The order button 23 operates a conventional multiple switch 114 which is illustrated schematically in FIG. 3 but which is not shown in FIG. 7 for purposes of clarity in illustration. The button 23 is returned to the normal position shown in FIG. 7 by means of a spring 364 and in its depressed position the button 23 has a cam surface 365 which engages the inclined surface 366 on the extension 367 on the bar 368. The bar 368 is normally urged to the right as viewed in FIG. 7 by means of a spring 369 but when the button 23 is depressed the bar 368 moves to the left. The bar 368 has a projection 370 thereon which is engageable with a projection 371 on the printing wheel assembly which, as the bar 368 moves to the left, first causes check 12 to move down and then causes the price printing wheels 15–18 to move forward and against the back of the check 12 thereby printing the positioned figures on the printing wheels 15–18 on the back of the check 12, the figures in the case assumed being 2020.

The check button 24 is similarly returned to the normal position shown in dotted lines in FIG. 7 by means of a spring 375, the button 24 being shown in full lines in its depressed position in FIG. 7. The end of the shaft extending from the button 24 has a cam surface 376 thereon which is engageable with the inclined surface 377 on the extension 378 on the bar 368. It will be noted that the inclined surface 377 extends at a shallower angle with respect to the bar 368 than the inclined surface 366. In addition, the length of the surface 377 is greater than the length of the inclined surface 366 so that when the button 24 is depressed, the bar 368 moves a greater distance to the left than when the button 23 is depressed. As a result, when the bar 368 is moved by virtue of the operation of the check button 24 the projection 370 not only causes printing of the figures on the wheels 15–18 on the back of the check 12 but also causes scribing of the carbon strip 14 on the back of the card 12 in the manner hereinafter described and movement of the detent fingers 380 into the path of projections on the wheels 17 and 18 for the purposes of zeroing these wheels 17 and 18 as hereinafter described.

The price printing wheels 15–18 are carried by a U-shaped bracket 381 carried on a pair of extensions 382 and 383 which are slideably mounted in a pair of brackets 384 and 385. The printing wheels 15–18 are urged away from the back of the card 12 by a pair of springs 386 and 387.

The cancel button 22 is not mechanically interconnected with the other buttons and merely operates the switch contacts 39 which have been described in conjunction with FIG. 3.

FIGS. 8, 9 and 10 illustrate the mechanical arrangement of the price printing wheels 15–18. The printing wheels 15–18 are mounted on a fixed shaft 390, the printing wheels 15–18 being rotatable thereon. The printing wheels 15 and 16 are rotatable by means of conventional electrically energizable coils (not shown in FIG. 8) which control the positions of the wheels 15 and 16 either directly or indirectly through a conventional drive mechanism in the same manner that the indicating element of an ammeter is controlled in position by its coil so that the positions assumed by the wheels 15 and 16 are dependent upon the strength of the current flowing through the energizing coils. A gear 391 rotates with the wheel 15 and drives a gear 392 which in turn rotates a gear 393 by virtue of a shaft 394 interconnecting said gears, and the gear 393 drives a gear 395 which is secured to a one-way clutch 396. The clutch 396 is rotatable on the shaft 390 and has a pair of flexible extensions 397 and 398 which are engageable with the interior surface of the printing wheel 17. Thus, when the clutch 396 is rotated counterclockwise as viewed in FIG. 8, the clutch 396 carries the wheel 17 with it. However, when the clutch 396 rotates in the clockwise direction as viewed in FIG. 8, the printing wheel 17 remains stationary, the wheel being held in position by means of a spring 399 (FIG. 10) which is engageable with the wheel 17 at the depressions 400 in the periphery thereof and at each numeral position around the periphery thereof.

Thus, as the printing wheel 15 rotates from its normal or "zero" position, it carries the printing wheel 17 therewith so that the printing wheel 17 is carried to the maximum departure position of the wheel 15 from its "zero" position. Furthermore, when the wheel 15 returns to it "zero" position, the wheel 17 continues to indicate the number corresponding to the position to which the wheel 15 was rotated by virtue of the current applied to the associated rotating coil. For example, if the wheel 15 were rotated so that the number 3 appears adjacent the back of the card or check 12 then the wheel 17 will also be rotated so that the number 3 thereon will also be adjacent the back of the check 12. Also as the wheel 15 returns to its zero position when the coil associated therewith is de-energized, the wheel 17 will continue to have the number 3 adjacent the back of the check 12.

Price printing wheel 16 is similar in operation and construction to the printing wheel 15, and it is interconnected by means of gears 401 and 402 and a shaft 403 with a gear 404 which similarly drives a one-way clutch like the clutch 396 which controls the position of the printing wheel 18. Thus, upon initial operation of the printing wheel 16 and the printing wheel 18, the printing wheel 18 will have the same number adjacent the back of the check 12 as the printing wheel 16 has adjacent the back of the check 12 when it is moved by virtue of the current in its associated rotating coil. However, the wheel 18 is also interconnected with the wheel 17 by a conventional gear and Geneva movement comprising the gears 405 and 406 and the gear teeth 407 so that when the printing wheel 17 makes one complete revolution it causes the wheel 18 to move a fraction of a revolution corresponding to the distance between the numerals on the periphery thereof. Thus, the wheels 17 and 18 accumulate the total movement of the wheels 15 and 16 from their "zero" positions and the wheels 17 and 18 indicate the total of the price units corresponding to the price of the food items ordered by a customer.

In order that the amount to be carried from wheel 17 to wheel 18 will be carried thereto prior to movement of the wheel 18 by the wheel 16 the arm on the switch 114 (FIG. 3) which interconnect the contacts 113 and 116 engage prior to engagement of the arm which interconnects the contacts 112 and 115 with such contacts. Furthermore, the arm which interconnects the contacts 113 and 116 remains in engagement therewith during all of the time that the button 23 is depressed.

When a customer has completed his order and operates the check button 24 for the purpose of obtaining his check 12, it is necessary to reset the accumulating wheels 17 and 18 to their "zero" positions. As pointed out above, when the check button 24 is depressed, the extension 370 on the bar 368 moves the fingers 380 (FIG. 10) forwardly so that they are in the path of a pair of ears or extensions on the wheels 17 and 18, one such ear being illustrated at 410 in FIG. 8. As previously described, operation of the check button 24 causes full voltage to be applied to the coils which control the positions of the wheels 15 and 16 but such voltage is not applied until after the fingers 380 have moved into the path of the ears on the wheels 17 and 18, such as the ear 410. Thus, even though the wheels 15 and 16 rotate amounts corresponding to the spacing between nine of the numerals on the wheels 15 and 16, the wheels 17 and 18 move only until the fingers 380 engage the ears 410 thereon which thereby causes the "zero" on the surfaces thereof to stop adjacent the rear surface of the check 12. When the wheels 15 and 16 are thereafter returned to their "zero" positions, the wheels 17 and 18 remain with their "zeros" adjacent the back of the check 12. The fingers 380 are not removed from the paths of the ears 410 until after the coils which operate the wheels 15 and 16 are de-energized.

Referring now to FIG. 11, this figure shows the bar 368 in the position which it assumes when either the order button 23 or the check button 24 is initially depressed. In this position of the bar 368, the pivoted arm 415 having a flexible knife edge 415a has been moved downwardly by virtue of the raised portion 416 on the bar 368 which is engageable with the arm 417. Downward movement of the arm 415 causes the check 12 to move downwardly within the slot 13 because of engagement of the end 415a with the back of the check 12. If it is assumed that the order button 23 was depressed, then the bar 368 will continue to move to the right as viewed in FIG. 11 as the order button 23 is further depressed and will cause engagement of the extension 370 with the projection 371 on the printing wheel assembly bracket 381 thereby causing the printing wheels 15–18 to print on the back of the check 12. However, even though the order button 23 is fully depressed, the end of the bar 368 and the projection 370 do not move far enough to engage respectively the projection 418 and the fingers 380. When the order button 23 is released the bar 368 moves to the left as viewed in FIG. 11 permitting the printing wheels 15–18 to move away from the back of the check 12 and permitting the arm 415 to move upwardly and out of engagement with the check 12. Detent 429 holds the check 12 in position when 415a is disengaged from the check 12.

When the check button 24 is depressed, the action previously described takes place but in addition, the projection 370 moves to the right beyond the projection 371 permitting the printing wheels 15–18 to move away from the back of the check 12, causing the projection 370 to engage the fingers 380 and move them forward (away from the viewer as viewed in FIG. 11) and causing the end portion 368a of the bar 368 to engage the projection 418. Before the end 368a engages the projection 418 and while the fingers 380 have been moved forward by the projection 370, the extension or projection 368c engages and closes the contacts 320 applying the maximum voltage to the operating coils for the wheels 15 and 16 and thereby causing "zeroing" of the wheels 17 and 18 as heretofore described.

Engagement of the end 368a with the projection 418 causes the bracket 381 to move to the right as viewed in FIG. 11 against the pressure of the springs 419 and 420. The bracket 381 has a resilient scribing arm 421 mounted thereon which prior to the movement of the bracket 381 to the right rests against the formed bottom of the slot 422 and as the bracket 381 moves to the right, the pointed end of the device 421 is permitted, by virtue of the formation of the bottom of the slot 422, to extend through the slot 422 and engage the back of the check 12. As the bracket 381 continues to move to the right, the pointed end of the device 421 scratches or scribes the carbon strip 14 causing an electrical discontinuity at the point scratched or scribed. As the bracket 381 moves further to the right the end of the scribing device 421 again engages the bottom wall of the slot 422 and becomes withdrawn from contact with the back of the check 12. At this time, the check button 24 is fully depressed and remains in its fully depressed position by virtue of the engagement of the projection 363 with the extension 361 on the bar 359 (FIG. 7).

Prior to the arrival of the bar 368 at its farthest right position as viewed in FIG. 11 the raised portion 416 thereof passes out from beneath the arm 417, permitting the arm 415 to move upwardly and become disengaged from the check 12. Also, as the bar 368 approaches its farthest right position as viewed in FIG. 11 the portion 368b thereof engages an arm 425 which is pivotally mounted at 426 and thereby causes a bar 427 to move to the left as viewed in FIG. 11 against the pressure of a spring 428. Bar 427 at the end thereof has a detent point 429 which permits downward movement of the check 12 when the point 429 is in engagement with the edge thereof but which prevents withdrawal of the check 12 when the point 429 is in engagement with the edge thereof. Thus, when the bar 427 is moved to the left as described, the point 429 is disengaged from the edge of the check 12 thereby releasing the check 12 for withdrawal from the slot 13.

A spring arm 430 is mounted at one side wall of the slot 13 and is normally held in the position shown in FIG. 11 by the pressure of the check 12. However, when the lower edge of the check 12 passes beyond the arm 430 during removal of the check 12 from the slot 13 the end 431 momentarily closes the contacts 321 which causes energization of the release coil 32 (FIG. 3) thereby releasing the check button 24 and returning it to its normal position. It will be noted that when the check 12 is inserted in the slot 13 engagement of the check 12 with the arm 430 also causes momentary closing of the contacts 321 for clearing the circuits and buttons as heretofore described.

FIGS. 12, 13 and 14 are partly schematic, perspective views showing details of the mechanisms operated by the numbered buttons 20. In FIG. 12 button 20–1 is shown in its depressed position whereas the remaining buttons 20 are in their normal or unoperated positions. Whenever a button 20 is released by the customer, it is returned to its normal or unoperated position by means of a spring such as the spring 435. The construction and arrangement of each of the buttons 20 except for the button 20–0 is the same and therefore only the details of the construction and operation of the button 20–1 will be described. The mechanical functions of the button 20–0 are the same as the mechanical functions of the other buttons 20, but the button 20–0 does not have contacts associated therewith.

The button 20–1 operates a shaft 436 which has a collar 437 thereon engageable with a slotted plate 438 which is pivotally mounted on a shaft 439 and which is returned to a normal position by means of a spring 440. A pair of arms 441 and 442 extend from the plate 438 and the ends of the arms 441 and 442 are received in recesses or slots 443 and 444 in the ends of slideable racks 445 and 446. A switch arm bearing, insulating plate 447 is mounted so as to be movable in the directions indicated by the arrow 448, the plate 447 being urged to the right as viewed in FIG. 12 by a spring 449 and the forward or right hand movement of the plate 447 being limited by a projection 450 thereon which is engageable with the stop 451.

The plate 447 carries a detent 452 engageable with the teeth on the rack 445 and a detent 453 engageable with the teeth on a fixed rack 454. When the rack 445 moves to the right, as a button 20 is pushed, the detent 452 rides over the teeth thereof. With the coding system for the food items assumed, the plate 447 carries, for each numbered button 20, a maximum of seven switch arms 455. The switch arms 455 are normally in the raised positions shown, being spring returned to such positions, but when the button 20–1 is depressed, the end of the shaft 436 depresses a finger 456 which engages an arm 457 and pushes the switch arm 455 downwardly to the position shown at the left end of the row of contacts 455 in FIG. 12.

When the button 20–1 is released by the customer, the slotted plate 438 rotates about the shaft 439 and by means of the arms 441 and 442 moves the slideable racks 445 and 446 and hence the insulating plate 447 to the left as viewed in FIG. 12. As the plate 447 moves to the left, the detent 453 rides over the teeth on the fixed rack 454. As the plate 447 moves to the left the contacts 455a moves under the contact bar 70 and the contact 458 mounted on the insulating strip 459 and when the button 20–1 returns to its normal position, the finger 456 is released permitting the switch arm 455a, to engage and interconnect the bar 70 and the contact 458. The detent 453 holds the plate 447 in the position to which it is moved by release of a button 20.

Thus, as each button 20 is pushed, the insulating plate 447 makes one step to the left, and the switch arms which are operated into engagement with the contact bar 70 and the contacts on the strip 459 depends upon which of the buttons 20 is operated. Similarly, if button 20–1 were depressed again, another one of the switch arms 455 would come into contact with the contact bar 70 and contact 458 for the purposes described in connection with FIG. 3.

FIG. 14 illustrates the release coil 32 which releases the various buttons associated with the ordering unit 10. As shown in FIG. 14, each of the bars 353 and 359 has an extension 460 and 461 thereon which is engageable by the piston 462 which is caused to move to the right when the coil 32 is energized as heretofore described. The piston 462 is returned to the position shown in FIG. 14 by the spring 463. As pointed out above, movement of the bars 353 and 359 to the right will release the button of the buttons 21, 23 and 24 which has been depressed previously.

The bar 353 also has an arm 464 extending therefrom which is engageable with the end of a slide 465 having a pair of raised portions 466 and 467 at opposite ends thereof. When the solenoid 32 is energized, it moves the slide 465 to the right, as viewed in FIG. 12 raising the detents 452 and 453 and permitting the plate 447 to move to the right until the projection 450 engages the stop 451. The slide 465 remains in the position in which the detents 452 and 453 are raised until such time as the end 470 thereof strikes a cam 471 which causes the slide 465 to move to the left and thereby lower the detents 452 and 453. When the plate 447 has returned to its unoperated position, all of the contact arms 455 have become disengaged from the contact bar 70 and the contacts on the strip 459 so that all of the indicators appearing in the window 19 (FIG. 1) return to their "zero" positions.

It is believed to be clear from the foregoing that the preferred embodiment of the invention provides means whereby many customers can simultaneously use the ordering units and can order a large number of food items using a relatively few push buttons, the number of buttons being substantially less than the number of items which may be ordered. In addition, only a number of indicators or printers corresponding to the number of places at which the various food items are available is required, there being only one indicator or printer at each place. Also, the code (except for the routing letter suffix) of each item ordered is indicated at the ordering unit, the price of each item and the total charges are printed automatically on the customer's check, the position to which an item is to be delivered is automatically indicated or printed at the place where the item is available and the orders are indicated or printed at the place where the items are available in the sequence in which the orders are placed, insuring prompt and orderly delivery of the items ordered.

However, it will be apparent to those skilled in the art that certain of the foregoing desirable features, and the apparatus for providing them, may be omitted and a satisfactory ordering system will still be obtained. For example, the items may all be available at one place and in such event, only one printer, one control unit and one priority storage unit, such as the printer 160, the control unit 163 and the priority storage unit 153, are required, the others being omittetd, the transfer switches 151 may be simplified, the "B" and "C" positions and associated components being omitted, and the buttons 21 and their associated switches and circuits may be omitted. If desired, the code indicator 100–107 may be omitted, and if checks showing the price and/or total charges to a customer are to be prepared by restaurant personnel, the charge printing wheels 15–19 and associated components may be omitted as well as the check 12 if the switches and circuits controlled by the check 12 are otherwise operated, such as manually.

It will be apparent also that other well known types of circuits, switching mechanisms and printing devices having corresponding functions may be substituted for the circuits, switching mechanisms and printing devices shown and described herein.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

What is claimed as new and desired to be secured by Letters Patent is:

1. A food ordering system for a restaurant having a plurality of customer's serving positions, said system comprising means for ordering a plurality of items from a predetermined position comprising a plurality of manually operable item switch means, check receiving means, releasable detent means associated with said receiving means for holding a check in said receiving means, printing means associated with said receiving means for printing on a check in said receiving means and controlled by said item switch means, manually operable order switch means electrically interconnected with said item switch means, and manually operable check releasing means mechanically interconnected with said printing means and said detent means for causing printing on said check by said printing means and for causing release of said detent means.

2. A food ordering system for a restaurant having a plurality of customer's serving positions, said system comprising means for ordering a plurality of items from a predetermined position comprising a plurality of manually operable item switch means, a plurality of manually operable routing switch means, check receiving means, releasable detent means associated with said receiving means for holding a check in said receiving means, printing means associated with said receiving means for printing on a check in said receiving means and controlled by said item switch means, manually operable order switch means electrically interconnected with said item and routing switch means, means mechanically interconnecting said order switch means with said printing means for causing printing on said check by said printing means, and manually operable check releasing means mechanically interconnected with said printing means and said detent means for causing printing on said check by said printing means and for causing release of said detent means.

3. A food ordering system for a restaurant having a plurality of customer's serving positions, said system comprising means for ordering a plurality of items from a predetermined position comprising a plurality of item code buttons, first switch means operable by said buttons, code indicating means controlled by said switch means, a plurality of routing buttons, second switch means operable by said routing buttons, check receiving means, third switch means adjacent said check receiving means and controllable by a check inserted in said receiving means, releasable detent means adjacent said receiving means for holding a check in said receiving means, printing means adjacent said receiving means for printing on a check in said receiving means and controlled by said first switch means, an order button, fourth switch means operable by said order button and electrically interconnected with said first and second switch means, means mechanically interconnecting said order button with said printing means for causing printing on said check by said printing means, and check releasing means mechanically interconnected with said printing means and said detent means for causing printing on said check by said printing means and for causing release of said detent means.

4. A food ordering system for a restaurant having a plurality of customer's serving positions, said system comprising means for ordering a plurality of items having different predetermined codes assigned thereto from a predetermined position, said ordering means comprising a plurality of manually operable item switch means operable in accordance with said codes for preparing electrical circuits dependent upon the operation of said switch means, a plurality of manually operable routing switch means for preparing electrical circuits dependent upon the operation of said routing switch means, check receiving means, check switch means associated with said check receiving means and controllable by a check inserted in said receiving means, releasable detent means associated with said receiving means for holding a check in said receiving means, printing means associated with said receiving means for printing on a check in said receiving means and controlled by said item switch means, manually operable order switch means electrically interconnected with said item and routing switch means for completing said electrical circuits prepared thereby, means mechanically interconnecting said order switch means with said printing means for causing printing on said check by said printing means when said order switch means is operated, and check releasing means mechanically interconnected with said printing means and said detent means for causing printing on said check by said printing means and for causing release of said detent means.

5. A food ordering system for a restaurant having a plurality of customer's serving positions, said system comprising means for ordering a plurality of items having different predetermined codes assigned thereto from a predetermined position, said ordering means comprising a plurality of item code buttons manually operable, in accordance with said codes, first switch means operable by said buttons for preparing electrical circuits dependent upon the operation of said buttons, a plurality of routing buttons, second switch means operable by said routing buttons for preparing electrical circuits dependent upon the operation of said routing buttons, check receiving means for receiving a check having a conductive portion, third and fourth switch means associated with said check receiving means and controllable respectively by a check inserted in said receiving means and by the conductive portion thereof, releasable detent means associated with said receiving means for holding a check in said receiving means, printing means associated with said receiving means for printing on a check in said receiving means and controlled by said first switch means, an order button, fifth switch means operable by said order button and electrically interconnected with said first and second switch means for completing said electrical circuits prepared thereby, means mechanically interconnecting said order button with said printing means for causing printing on said check by said printing means when said order button is operated, check releasing means mechanically interconnected with said printing means and said detent means for causing printing on said check by said printing means and for causing release of said detent means, means controlled by said third switch means for returning said code and routing buttons, said order button and said check releasing means to their unoperated positions and sixth switch means for controlling said returning means.

6. A food ordering system for restaurants having a plurality of customer's positions and a plurality of food preparation places, said system comprising customer ordering units, one at each of said positions, having manually operable switching means for ordering food items desired by a customer in accordance with a predetermined code; printing means, one at each of said places, for printing the code of food items ordered at said ordering units and the position code for the unit at which a food item is ordered; control means connected to said printing means for causing operation of said printing means and for providing a signal when said printing means is free to print; priority storage units, one for each of said places, connected to and controllable by said switching means for storing information as to the sequence in which orders are placed at said ordering units and controlled by said signal of said control means; and transfer switch means, one for each of said ordering units, connected to and controlled by the switching means of the corresponding ordering unit and connected to and controlled by said storage units, said transfer switch means also being connected to said control means for transferring food item code information from the corresponding ordering unit and for providing ordering unit position code information to said control means when operated by one of said storage units.

7. A food ordering system for restaurants having a plurality of customer's positions and a plurality of food preparation places, said system comprising customer ordering units, one at each of said positions, having manually operable switching means for ordering food items desired by a customer in accordance with a predetermined code; printing means, one at each of said places, for printing the code of food items ordered at said ordering units and the position code for the unit at which a food item is ordered; control means for causing operation of said printing means and for providing a signal when said printing means is free to print; priority storage units, one for each of said places, controllable by said ordering units for storing information as to the sequence in which orders are placed at said ordering units and controlled by said signal of said control means; and transfer switch means, one for each of said ordering units, controlled by the corresponding ordering unit and by said storage units for transferring food item code information from the corresponding ordering unit to, and for providing ordering unit position code information to, said control means; each of said ordering units also comprising manually operable switching means for selecting the priority storage unit controlled by an operated ordering unit and releasing means for returning said manually operable switching means to their unoperated positions and said transfer switch means having switching means connected to said releasing means for causing operation thereof upon return of the transfer switch means to its unoperated position.

8. A food ordering system for restaurants having a plurality of customer's positions and a plurality of food preparation places, said system comprising customer ordering units, one at each of said positions, having manually operable switching means for ordering food items desired by a customer in accordance with a predetermined code; printing means, one at each of said places, for printing the code of food items ordered at said ordering units and the position code for the unit at which a food item is ordered; control means connected to said printing means for causing operation of said printing means and for providing a signal when said printing means is free to print; priority storage units, one for each of said places, connected to and controllable by said switching means for storing information as to the sequence in which orders are placed at said ordering units and controlled by said signal of said control means; and transfer switch means, one for each of said ordering units, connected to and controlled by the switching means of the corresponding ordering unit and connected to and controlled by said storage units, said transfer switch means also being connected to said control means for transferring food item code information from the corresponding ordering unit and for providing ordering unit position code information to said control means when operated by one of said storage units, each of said ordering units also comprising releasing means for returning said switching means to their unoperated positions and said transfer switch means having switching means connected to said releasing means for causing operation thereof upon return of the transfer switch means to its unoperated position.

(References on following page)

References Cited by the Examiner

UNITED STATES PATENTS

| | | | |
|---|---|---|---|
| 2,698,699 | 8/1949 | Skillman | 221—6 |
| 2,707,038 | 4/1955 | Szady | 192—41 |
| 2,766,637 | 10/1956 | Bock | 74—368 |
| 2,792,148 | 5/1957 | Goldenberg | 222—2 |
| 2,792,714 | 5/1957 | Forster | 74—368 |
| 2,873,833 | 2/1959 | Hogan | 192—41 |
| 2,957,548 | 10/1960 | Davy | 186—1 |
| 2,970,877 | 2/1961 | Parsons et al. | 346—34 |
| 2,977,024 | 3/1961 | Harris | 222—2 |

LEO SMILOW, *Primary Examiner.*

JULIA E. COINER, LEYLAND M. MARTIN,
*Examiners.*